(12) United States Patent
Li et al.

(10) Patent No.: US 11,805,553 B2
(45) Date of Patent: Oct. 31, 2023

(54) CONTROL METHOD, NETWORK DEVICE, AND TERMINAL

(71) Applicants: China Mobile Communication Co., Ltd Research Institute, Beijing (CN); China Mobile Communications Group Co., Ltd., Beijing (CN)

(72) Inventors: Nan Li, Beijing (CN); Haiyu Ding, Beijing (CN); Yuhong Huang, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 37 days.

(21) Appl. No.: 17/050,232

(22) PCT Filed: Apr. 1, 2019

(86) PCT No.: PCT/CN2019/080773
§ 371 (c)(1),
(2) Date: Oct. 23, 2020

(87) PCT Pub. No.: WO2019/205893
PCT Pub. Date: Oct. 31, 2019

(65) Prior Publication Data
US 2021/0084691 A1     Mar. 18, 2021

(30) Foreign Application Priority Data
Apr. 28, 2018   (CN) .......................... 201810402062.3

(51) Int. Cl.
*H04W 74/08*   (2009.01)
*H04W 28/02*   (2009.01)
*H04W 28/24*   (2009.01)

(52) U.S. Cl.
CPC ... *H04W 74/0833* (2013.01); *H04W 28/0289* (2013.01); *H04W 28/24* (2013.01)

(58) Field of Classification Search
CPC ......... H04W 28/0289; H04W 74/0833; H04W 28/0205; H04W 28/24; H04W 28/0247; H04W 28/08
See application file for complete search history.

(56) References Cited

U.S. PATENT DOCUMENTS 9,888,385 B1 * 2/2018 Oh .......................... H04W 4/70
10,433,343 B2 * 10/2019 Chen ................. H04W 74/0833
(Continued)

FOREIGN PATENT DOCUMENTS

| CN | 101114873 A |   | 1/2008 |
| CN | 101222756 A | * | 7/2008 |

(Continued)

OTHER PUBLICATIONS

Chinese Office Action (First) dated May 27, 2020, for Chinese Patent Application No. 201810402062.3, 10 pages.
(Continued)

*Primary Examiner* — Mehmood B. Khan
(74) *Attorney, Agent, or Firm* — MORGAN, LEWIS & BOCKIUS LLP

(57) ABSTRACT

The present disclosure provides a control method, a network device, and a terminal. The control method includes transmitting a first limit value for at least one of load control, congestion control and access control.

15 Claims, 5 Drawing Sheets

(56) References Cited

U.S. PATENT DOCUMENTS

| | | | |
|---|---|---|---|
| 11,425,578 B2* | 8/2022 | Wei | H04W 72/12 |
| 11,425,720 B2* | 8/2022 | Islam | H04W 74/0833 |
| 2012/0163512 A1* | 6/2012 | Johansson | H04J 11/0046 |
| | | | 375/340 |
| 2012/0236717 A1* | 9/2012 | Saska | H04W 36/30 |
| | | | 370/235 |
| 2014/0134984 A1* | 5/2014 | Mufti | H04W 4/70 |
| | | | 455/414.1 |
| 2018/0035469 A1* | 2/2018 | Chen | H04W 74/0833 |
| 2018/0376407 A1* | 12/2018 | Myhre | H04W 76/27 |
| 2020/0329503 A1* | 10/2020 | Da Silva | H04W 36/0055 |
| 2020/0374921 A1* | 11/2020 | Li | H04W 68/005 |
| 2023/0077779 A1* | 3/2023 | Basu Mallick | H04L 1/1825 |

FOREIGN PATENT DOCUMENTS

| | | | | |
|---|---|---|---|---|
| CN | 101848495 A | | 9/2010 | |
| CN | 102740374 A | | 10/2012 | |
| CN | 102740493 A | * | 10/2012 | |
| CN | 102740493 A | | 10/2012 | |
| CN | 104796942 A | | 7/2015 | |
| CN | 105007594 A | | 10/2015 | |
| CN | 105792382 A | | 7/2016 | |
| EP | 4040910 A1 | * | 8/2022 | H04W 74/0833 |
| WO | WO-2019205896 A1 | * | 10/2019 | |

OTHER PUBLICATIONS

English Translation of Chinese Office Action (First) dated May 27, 2020, for Chinese Patent Application No. 201810402062.3, 12 pages.

Chinese Written Opinion of the International Searching Authority dated Nov. 12, 2020 for PCT/CN2019/080773, 8 pages.

International Preliminary Report on Patentability with Written Opinion (in English) dated Nov. 12, 2020 for PCT/CN2019/080773, 6 pages.

S5-182117, 3GPP TSG-SA5 Meeting #118, Beijing, China, Apr. 9-13, 2018, Current Version: 14.1.0.

* cited by examiner

CONTROL METHOD, NETWORK DEVICE, AND TERMINAL

CROSS-REFERENCE TO RELATED APPLICATION

The present application is the U.S. national phase of PCT Application No. PCT/CN2019/080773 filed on Apr. 1, 2019, which claims a priority of the Chinese patent application No. 201810402062.3 filed on Apr. 28, 2018, which is incorporated herein by reference in its entirety.

TECHNICAL FIELD

The present disclosure relates to the field of communication technology, in particular to a control method, a network device, and a terminal.

BACKGROUND

Mobile communication technology, represented by a $4^{th}$-Generation (4G) technology, has promoted the rapid development of mobile Internet, and communication between people has been at a highest level ever. In future, a $5^{th}$-Generation (5G) technology will bring "Internet for people" into a more imaginative Internet of Things (IoT) era with "Internet for people and things" and "Internet for things". The application of the IoT needs to provide a very-long-range coverage. Usually low frequencies, e.g., 800 MHz to 900 MHz, are adopted by operators to provide IoT services, but bandwidths at these frequencies are very limited. Hence, in the future 5G IoT era, in a specific service scenario, e.g., a scenario where data is reported by a remote meter reading system regularly or a scenario where position information about shared bikes are updated intensively at a hot-spot region such as subway station, a huge quantity of IoT terminals may initiate random access requests at the same time, resulting in random access resource congestion in a cell.

SUMMARY

An object of the present disclosure is to provide a control method, a network device and a terminal, so as to solve the problem in the related art where a random access resource congestion in a cell occurs when random access requests are initiated by the terminals at the same time.

In one aspect, the present disclosure provides in some embodiments a control method, including transmitting a first limit value for at least one of load control, congestion control and access control.

In a possible embodiment of the present disclosure, the first limit value is a numerical value at a predetermined base system and with predetermined digits.

In a possible embodiment of the present disclosure, the first limit value is directly represented by the numerical value at the predetermined base system and with the predetermined digits; or the first limit value is represented by a coefficient and an index, the coefficient is represented by a numerical value at the predetermined base system and with at least one digit in the predetermined digits, and the index is represented by a numerical value at the predetermined base system and with the remaining digits in the predetermined digits; or the first limit value consists of a first part and a second part, the first part is represented by at least one digit 0, and the second part is represented by a numerical value at the predetermined base system with the remaining digits in the predetermined digits.

In a possible embodiment of the present disclosure, the transmitting the first limit value includes transmitting the corresponding first limit value in accordance with an access type, a terminal protocol version, a category, a Quality of Service (QoS) requirement, an access request type, a terminal brand and/or a terminal type.

In a possible embodiment of the present disclosure, the control method further includes transmitting an algorithm identifier, and an algorithm corresponding to the algorithm identifier is a target algorithm adopted by a terminal for calculating a second limit value.

In a possible embodiment of the present disclosure, the first limit value and/or the algorithm identifier is configured dynamically or periodically.

In a possible embodiment of the present disclosure, the first limit value and/or the algorithm identifier are configured in accordance with a load of a network device; or the first limit value and/or the algorithm identifier are configured in accordance with the quantity of random access requests received within a first time window or a predicted value of the quantity of random access requests received within a second time window.

In a possible embodiment of the present disclosure, the configuring the first limit value in accordance with the load of the network device includes: when the load of the network device is greater than a first threshold, decrementing the first limit value by at least one adjustment step; or when the load of the network device is smaller than a second threshold, incrementing the first limit value by at least one adjustment step.

In a possible embodiment of the present disclosure, the configuring the algorithm identifier in accordance with the load of the network device includes: when the load of the network device is greater than a third threshold, changing the algorithm identifier; or when the load of the network device is smaller than a fourth threshold, changing the algorithm identifier.

In a possible embodiment of the present disclosure, the configuring the first limit value in accordance with the quantity of random access requests received within the first time window or the predicted value of the quantity of random access requests received within the second time window includes: when the quantity of random access requests received within the first time window is smaller than a fifth threshold or the predicted value of the quantity of random access requests received within the second time window is smaller than a sixth threshold, incrementing the first limit value by at least one adjustment step; or when the quantity of random access requests received within the first time window is greater than a seventh threshold or the predicted value of the quantity of random access requests received within the second time window is greater than an eighth threshold, decrementing the first limit value by at least one adjustment step.

In a possible embodiment of the present disclosure, the configuring the algorithm identifier in accordance with the quantity of random access requests received within the first time window or the predicted value of the quantity of random access requests received within the second time window includes: when the quantity of random access requests received within the first time window is smaller than a ninth threshold or the predicted value of the random access requests received within the second time window is smaller than a tenth threshold, changing the algorithm identifier; or when the quantity of random access requests received within the first time window is greater than an eleventh threshold or the predicted value of the quantity of random access requests received within the second time window is greater than a twelfth threshold, changing the algorithm identifier.

In a possible embodiment of the present disclosure, the control method further includes receiving a random access request carrying the second limit value, or the random access request and the second limit value, from the terminal.

In a possible embodiment of the present disclosure, the second limit value is acquired through calculating, by the terminal, a terminal identifier and/or first information in accordance with a predetermined algorithm or a target algorithm corresponding to the algorithm identifier.

In a possible embodiment of the present disclosure, the first information includes a first field and/or a second field, and the second limit value is acquired through calculating, by the terminal, the terminal identifier and/or the first field and/or the second field of the first information in accordance with the predetermined algorithm or the target algorithm corresponding to the algorithm identifier.

In a possible embodiment of the present disclosure, the first field or the second field is a field having a fixed or variable length, or the second field is a filled value at a predetermined base system.

In a possible embodiment of the present disclosure, the first field includes at least one of information about an algorithm identifier adopted for determining the second limit value, information about a time-domain resource for transmitting the random access request, a serial number of the time-domain resource for transmitting the random access request, information about a frequency-domain resource for transmitting the random access request, a serial number of the frequency-domain resource for transmitting the random access request, information about a preamble for transmitting the random access request, a serial number of the preamble for transmitting the random access request, and a network identifier.

In a possible embodiment of the present disclosure, the random access request carrying the second limit value, or the random access request and the second limit value, is transmitted in the case that the second limit value is smaller than or equal to the first limit value; or the random access request carrying the second limit value, or the random access request and the second limit value, is transmitted in the case that the second limit value is greater than or equal to the first limit value.

In a possible embodiment of the present disclosure, the control method further includes: when the second limit value is smaller than or equal to the first limit value, transmitting a random access response to the terminal; or when the second limit value is greater than or equal to the first limit value, transmitting the random access response to the terminal.

In a possible embodiment of the present disclosure, the random access response includes the second limit value.

In a possible embodiment of the present disclosure, the control method further includes receiving the terminal identifier and/or second information from the terminal, the second information includes a first field and/or a second field, the first field includes at least one of information about an algorithm identifier adopted for determining the second limit value, information about a time-domain resource for transmitting the random access request, a serial number of the time-domain resource for transmitting the random access request, information about a frequency-domain resource for transmitting the random access request, a serial number of the frequency-domain resource for transmitting the random access request, information about a preamble for transmitting the random access request, a serial number of the preamble for transmitting the random access request, and a network identifier, and the second field includes a filled value at a predetermined base system adopted for determining the second limit value.

In a possible embodiment of the present disclosure, the control method further includes calculating the terminal identifier and/or the second information using a predetermined algorithm or a target algorithm corresponding to the algorithm identifier, to acquire a third limit value, and the predetermined algorithm or the target algorithm corresponding to the algorithm identifier includes one of a one-way function algorithm, a hash function algorithm and an elliptic function algorithm.

In a possible embodiment of the present disclosure, the control method further includes: when the second limit value is equal to the third limit value, transmitting a connection establishment completion message or a random access request transmission success message to the terminal; or when the third limit value is smaller than the first limit value, transmitting the connection establishment completion message or the random access request transmission success message to the terminal; or when the second limit value is smaller than or equal to the first limit value and the third limit value is equal to the second limit value, transmitting the connection establishment completion message or the random access request transmission success message to the terminal.

In a possible embodiment of the present disclosure, the control method further includes: when the second limit value is greater than the first limit value, transmitting a connection establishment completion message or a random access request transmission success message to the terminal; or when the second limit value is greater than or equal to the first limit value and the third limit value is equal to the second limit value, transmitting the connection establishment completion message or the random access request transmission success message to the terminal.

In a possible embodiment of the present disclosure, the control method further includes: when the second limit value is not equal to the third limit value, transmitting a connection establishment failure message or a random access request transmission failure message to the terminal; or when the second limit value is greater than or equal to the first limit value, transmitting the connection establishment failure message or the random access request transmission failure message to the terminal; or when the second limit value is equal to the third limit value and greater than or equal to the first limit value, transmitting the connection establishment failure message or the random access request transmission failure message to the terminal.

In a possible embodiment of the present disclosure, the control method further includes: when the second limit value is smaller than or equal to the first limit value, transmitting a connection establishment failure message or a random access request transmission failure message to the terminal; or when the second limit value is equal to the third limit value and smaller than or equal to the first limit value, transmitting the connection establishment failure message or the random access request transmission failure message to the terminal.

In another aspect, the present disclosure provides in some embodiments a control method, including receiving a first limit value for at least one of load control, congestion control and access control.

In a possible embodiment of the present disclosure, the first limit value is a numerical value at a predetermined base system and with predetermined digits.

In a possible embodiment of the present disclosure, the first limit value is directly represented by the numerical value at the predetermined base system and with the predetermined digits; or the first limit value is represented by a coefficient and an index, the coefficient is represented by a numerical value at the predetermined base system and with at least one digit in the predetermined digits, and the index is represented by a numerical value at the predetermined base system and with the remaining digits in the predetermined digits; or the first limit value consists of a first part and a second part, the first part is represented by at least one digit 0, and the second part is represented by a numerical value at the predetermined base system with the remaining digits in the predetermined digits.

In a possible embodiment of the present disclosure, the control method further includes receiving an algorithm identifier.

In a possible embodiment of the present disclosure, the control method further includes calculating a terminal identifier and/or first information in accordance with a predetermined algorithm or a target algorithm corresponding to the algorithm identifier to acquire a second limit value.

In a possible embodiment of the present disclosure, the first information includes a first field and/or a second field, and the second limit value is acquired through calculating, by the terminal, the terminal identifier and/or the first field and/or the second field of the first information in accordance with the predetermined algorithm or the target algorithm corresponding to the algorithm identifier.

In a possible embodiment of the present disclosure, the first field or the second field is a field having a fixed or variable length, or the second field is a filled value at a predetermined base system.

In a possible embodiment of the present disclosure, the first field includes at least one of information about an algorithm identifier adopted for determining the second limit value, information about a time-domain resource for transmitting the random access request, a serial number of the time-domain resource for transmitting the random access request, information about a frequency-domain resource for transmitting the random access request, a serial number of the frequency-domain resource for transmitting the random access request, information about a preamble for transmitting the random access request, a serial number of the preamble for transmitting the random access request, and a network identifier.

In a possible embodiment of the present disclosure, the control method further includes: when the second limit value is smaller than or equal to the first limit value, transmitting a random access request carrying the second limit value, or transmitting the random access request and the second limit value; or when the second limit value is greater than or equal to the first limit value, transmitting the random access request carrying the second limit value, or transmitting the random access request and the second limit value.

In a possible embodiment of the present disclosure, the control method further includes receiving a random access response, and the random access response is transmitted by a network device to the terminal when the second limit value is smaller than or equal to the first limit value or when the second limit value is greater than or equal to the first limit value.

In a possible embodiment of the present disclosure, the random access response includes the second limit value.

In a possible embodiment of the present disclosure, the control method further includes transmitting the terminal identifier and/or second information, the second information includes a first field and/or a second field, the first field includes at least one of information about an algorithm identifier adopted for determining the second limit value, information about a time-domain resource for transmitting the random access request, a serial number of the time-domain resource for transmitting the random access request, information about a frequency-domain resource for transmitting the random access request, a serial number of the frequency-domain resource for transmitting the random access request, information about a preamble for transmitting the random access request, a serial number of the preamble for transmitting the random access request, and a network identifier, and the second field includes a filled value at a predetermined base system adopted for determining the second limit value.

In a possible embodiment of the present disclosure, the control method further includes receiving a connection establishment completion message or a random access request transmission success message, and the connection establishment completion message or the random access request transmission success message is transmitted by the network device when the second limit value is equal to a third limit value, or when the third limit value is smaller than the first limit value, or when the second limit value is smaller than or equal to the first limit value and the third limit value is equal to the second limit value.

In a possible embodiment of the present disclosure, the control method further includes receiving a connection establishment completion message or a random access request transmission success message, and the connection establishment completion message or the random access request transmission success message is transmitted by the network device when the second limit value is greater than the first limit value, or when the second limit value is greater than or equal to the first limit value and the third limit value is equal to the second limit value.

In a possible embodiment of the present disclosure, the control method further includes receiving a connection establishment failure message or a random access request transmission failure message, and the connection establishment failure message or the random access request transmission failure message is transmitted by the network device when the second limit value is not equal to the third limit value, or when the second limit value is greater than or equal to the first limit value, or when the second limit value is equal to the third limit value and the second limit value is greater than or equal to the first limit value.

In a possible embodiment of the present disclosure, the control method further includes receiving a connection establishment failure message or a random access request transmission failure message, and the connection establishment failure message or the random access request transmission failure message is transmitted by the network device when the second limit value is smaller than or equal to the first limit value, or when the second limit value is equal to the third limit value and the second limit value is smaller than or equal to the first limit value.

In yet another aspect, the present disclosure provides in some embodiments a network device, including a transceiver configured to transmit a first limit value for at least one of load control, congestion control and access control.

In a possible embodiment of the present disclosure, the transceiver is further configured to transmit an algorithm identifier, and an algorithm corresponding to the algorithm identifier is a target algorithm adopted by a terminal for calculating a second limit value.

In a possible embodiment of the present disclosure, the transceiver is further configured to receive a random access request carrying the second limit value, or receive the random access request and the second limit value, from the terminal.

In a possible embodiment of the present disclosure, the transceiver is further configured to: when the second limit value is smaller than or equal to the first limit value, transmit a random access response to the terminal; or when the second limit value is greater than or equal to the first limit value, transmit the random access response to the terminal.

In a possible embodiment of the present disclosure, the transceiver is further configured to receive a terminal identifier and/or second information from the terminal, the second information includes a first field and/or a second field, the first field includes at least one of information about an algorithm identifier adopted for determining the second limit value, information about a time-domain resource for transmitting the random access request, a serial number of the time-domain resource for transmitting the random access request, information about a frequency-domain resource for transmitting the random access request, a serial number of the frequency-domain resource for transmitting the random access request, information about a preamble for transmitting the random access request, a serial number of the preamble for transmitting the random access request, and a network identifier, and the second field includes a filled value at a predetermined base system adopted for determining the second limit value.

In a possible embodiment of the present disclosure, the network device further includes a processor configured to calculate the terminal identifier and/or the second information using a predetermined algorithm or a target algorithm corresponding to the algorithm identifier, to acquire a third limit value, and the predetermined algorithm or the target algorithm corresponding to the algorithm identifier includes one of a one-way function algorithm, a hash function algorithm and an elliptic function algorithm.

In a possible embodiment of the present disclosure, the transceiver is further configured to: when the second limit value is equal to the third limit value, transmit a connection establishment completion message or a random access request transmission success message to the terminal; or when the third limit value is smaller than the first limit value, transmit the connection establishment completion message or the random access request transmission success message to the terminal; or when the second limit value is smaller than or equal to the first limit value and the third limit value is equal to the second limit value, transmit the connection establishment completion message or the random access request transmission success message to the terminal.

In a possible embodiment of the present disclosure, the transceiver is further configured to: when the second limit value is greater than the first limit value, transmit a connection establishment completion message or a random access request transmission success message to the terminal; or when the second limit value is greater than or equal to the first limit value and the third limit value is equal to the second limit value, transmit the connection establishment completion message or the random access request transmission success message to the terminal.

In a possible embodiment of the present disclosure, the transceiver is further configured to: when the second limit value is not equal to the third limit value, transmit a connection establishment failure message or a random access request transmission failure message to the terminal; or when the second limit value is greater than or equal to the first limit value, transmit the connection establishment failure message or the random access request transmission failure message to the terminal; or when the second limit value is equal to the third limit value and greater than or equal to the first limit value, transmit the connection establishment failure message or the random access request transmission failure message to the terminal.

In a possible embodiment of the present disclosure, the transceiver is further configured to: when the second limit value is smaller than or equal to the first limit value, transmit a connection establishment failure message or a random access request transmission failure message to the terminal; or when the second limit value is equal to the third limit value and smaller than or equal to the first limit value, transmit the connection establishment failure message or the random access request transmission failure message to the terminal.

In still yet another aspect, the present disclosure provides in some embodiments a terminal, comprising a transceiver configured to receive a first limit value for at least one of load control, congestion control and access control.

In a possible embodiment of the present disclosure, the transceiver is further configured to receive an algorithm identifier.

In a possible embodiment of the present disclosure, the terminal further includes a processor configured to calculate a terminal identifier and/or first information in accordance with a predetermined algorithm or a target algorithm corresponding to the algorithm identifier to acquire a second limit value.

In a possible embodiment of the present disclosure, the transceiver is further configured to: when the second limit value is smaller than or equal to the first limit value, transmit a random access request carrying the second limit value, or transmit the random access request and the second limit value; or when the second limit value is greater than or equal to the first limit value, transmit the random access request carrying the second limit value, or transmit the random access request and the second limit value.

In a possible embodiment of the present disclosure, the transceiver is further configured to receive a random access response, and the random access response is transmitted by a network device to the terminal when the second limit value is smaller than or equal to the first limit value or when the second limit value is greater than or equal to the first limit value.

In a possible embodiment of the present disclosure, the random access response includes the second limit value.

In a possible embodiment of the present disclosure, the transceiver is further configured to transmit the terminal identifier and/or second information, the second information includes a first field and/or a second field, the first field includes at least one of information about an algorithm identifier adopted for determining the second limit value, information about a time-domain resource for transmitting the random access request, a serial number of the time-domain resource for transmitting the random access request, information about a frequency-domain resource for transmitting the random access request, a serial number of the frequency-domain resource for transmitting the random access request, information about a preamble for transmitting the random access request, a serial number of the preamble for transmitting the random access request, and a network identifier, and the second field includes a filled value at a predetermined base system adopted for determining the second limit value.

In a possible embodiment of the present disclosure, the transceiver is further configured to receive a connection establishment completion message or a random access request transmission success message, and the connection establishment completion message or the random access request transmission success message is transmitted by the network device when the second limit value is equal to a third limit value, or when the third limit value is smaller than the first limit value, or when the second limit value is smaller than or equal to the first limit value and the third limit value is equal to the second limit value.

In a possible embodiment of the present disclosure, the transceiver is further configured to receive a connection establishment completion message or a random access request transmission success message, and the connection establishment completion message or the random access request transmission success message is transmitted by the network device when the second limit value is greater than the first limit value, or when the second limit value is greater than or equal to the first limit value and the third limit value is equal to the second limit value.

In a possible embodiment of the present disclosure, the transceiver is further configured to receive a connection establishment failure message or a random access request transmission failure message, and the connection establishment failure message or the random access request transmission failure message is transmitted by the network device when the second limit value is not equal to the third limit value, or when the second limit value is greater than or equal to the first limit value, or when the second limit value is equal to the third limit value and the second limit value is greater than or equal to the first limit value.

In a possible embodiment of the present disclosure, the transceiver is further configured to receive a connection establishment failure message or a random access request transmission failure message, and the connection establishment failure message or the random access request transmission failure message is transmitted by the network device when the second limit value is smaller than or equal to the first limit value, or when the second limit value is equal to the third limit value and the second limit value is smaller than or equal to the first limit value.

In still yet another aspect, the present disclosure provides in some embodiments a control method, including: transmitting, by a network device, a first limit value for at least one of load control, congestion control and access control; receiving, by a terminal, the first limit value; determining, by the terminal, a second limit value, and transmitting a random access request carrying the second limit value, or the random access request and the second limit value, to the network device when the second limit value is smaller than or equal to the first limit value, or transmitting the random access request carrying the second limit value, or the random access request and the second limit value, to the network device when the second limit value is greater than or equal to the first limit value; receiving, by the network side device, the random access request carrying the second limit value, or the random access request and the second limit value; and transmitting, by the network device, a random access response when the second limit value is smaller than or equal to the first limit value, or when the second limit value is greater than or equal to the first limit value.

In a possible embodiment of the present disclosure, the control method further includes: transmitting, by the terminal, a terminal identifier and/or second information; and transmitting, by the network device, a connection establishment completion message or a random access request transmission success message to the terminal, or transmitting a connection establishment failure message or a random access request transmission failure message to the terminal.

In still yet another aspect, the present disclosure provides in some embodiments a communication device, including a processor, and a memory storing therein a computer program. The computer program is executed by the processor so as to implement the above-mentioned method.

In still yet another aspect, the present disclosure provides in some embodiments a computer-readable storage medium storing therein an instruction. The instruction is executed by a computer so as to implement the above-mentioned method.

The embodiments of the present disclosure at least have the following beneficial effects. According to the embodiments of the present disclosure, the first limit value for the load control, the congestion control or the random access may be transmitted to the terminal, so that the terminal may perform the random access in accordance with the first limit value. As a result, it is able to prevent the occurrence of a random access resource congestion in a cell when the random access requests are initiated by the terminals at the same time.

DETAILED DESCRIPTION

Figure 1:
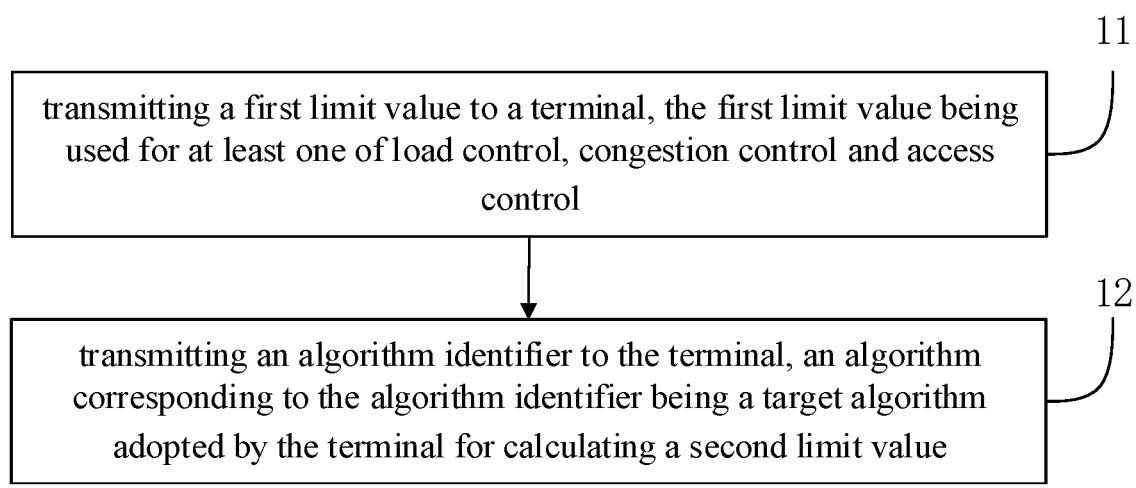
FIG. 1 is a flow chart of a control method at a network device side according to one embodiment of the present disclosure.

The present disclosure will be described hereinafter in conjunction with the drawings and embodiments. The following embodiments are for illustrative purposes only, but shall not be used to limit the scope of the present disclosure. Actually, the embodiments are provided so as to facilitate the understanding of the scope of the present disclosure.

In the related art, a huge quantity of IoT terminals may initiate random access requests at the same time, resulting in random access resource congestion in a cell. An object of the present disclosure is to provide a control method, a network device and a terminal, so as to prevent the occurrence of the random access resource congestion in the cell when the random access requests are initiated by the terminals at the same time.

The present disclosure provides in a first embodiment a control method applied for a network device, which includes transmitting a first limit value. To be specific, the network device may transmit the first limit value for at least one of load control, congestion control and access control to a terminal, and the access control may be to control the terminal to randomly access a network.

In this embodiment of the present disclosure, the network device may configure the first limit value and transmit it to the terminal, e.g., through broadcasting.

Here, the first limit value may be a numerical value at a predetermined base system and with predetermined digits.

For example, the first limit value may be represented by an 8-digit hexadecimal number 0x1903a30b, or represented by an 11-digit decimal number 10000293940, or represented by a 5-digit binary number 00100.

Here, the first limit value may be directly represented by the numerical value at the predetermined base system and with the predetermined digits, e.g., it may be directly represented as an 8-bit hexadecimal number 0x1903a30b, and correspondingly the first limit value may be just 0x1903a30b. Alternatively, the first limit value may be represented by a coefficient and an index, the coefficient may be represented by a numerical value at the predetermined base system and with at least one digit in the predetermined digits, and the index may be represented by a numerical value at the predetermined base system and with the remaining digits in the predetermined digits. For example, the first limit value may be represented by an 8-bit hexadecimal number 0x1903a30b, the index of the first limit value may be represented by the hexadecimal number with first two digits, and the coefficient of the first limit value may be represented by the hexadecimal number with the remaining six digits. When the first limit value is 0x1903a30b, the index may be the hexadecimal number with the first two digits, i.e., 0x19, and the coefficient may be the hexadecimal number with remaining six digits, i.e., 0x03a30b. At this time, the first limit value may be calculated through a formula T=coefficient*a^(b*(index−c)), where a, b and c are all integers. For example, T=coefficient*2^(8*(index−3)), i.e., T=0x03a30b*2^(0x8*(0x19−0x03)), where 0x represents a hexadecimal base system.

Here, the first limit value may consist of a first part and a second part, the first part may be represented by at least one digit 0, and the second part may be represented by a numerical value at the predetermined base system with the remaining digits in the predetermined digits. For example, the first part of the first limit value may be 0000000, which is used to represent a difficulty coefficient, and the second part may be 11101, which is used to represent a limit value. When an access control principle includes allowing the terminal to initiate an access request when a second limit value is smaller than or equal to the first limit value, the network device may increase the quantity of digits 0 in the first part so as to increase an access difficulty, or reduce the quantity of digits 0 in the first part so as to reduce the access difficulty. When the access control principle includes allowing the terminal to initiate the access request when the second limit value is greater than or equal to the first limit value, the network device may reduce the quantity of digits 0 in the first part so as to increase the access difficulty, or increase the quantity of digits 0 in the first part so as to reduce the access difficulty.

In this embodiment of the present disclosure, the transmitting the first limit value to the terminal by a network device may include transmitting the corresponding first limit value to the terminal in accordance with an access type, a terminal protocol version, a category, a QoS requirement, an access request type (e.g., contention-based access request or non-contention-based access request), a terminal brand and/or a terminal type. For example, the network device may configure different first limit values with respect to different access service types, different protocol versions, different terminal categories, different QoS requirements, the contention-based access request, the non-contention-based access request, and/or different terminal brands. The network device may transmit a sequence of first limit values for the random access control, and each numerical value in the sequence may correspond to a specific access type (different first limit values may be configured for different access service types, so as to control access priority levels for various service types, e.g., preferentially ensure a voice service access). Alternatively, the network device may configure different first limit values for the terminals with Release 15 and Release 16 (the terminal with a latest version has a strong computational capability, and different first limit values may be provided so as to ensure access fairness for the terminals with different versions). The network device may also configure different first limit values in conjunction with various conditions, so as to perform the access control effectively in a complex circumstance of an actual network. For example, when the access control principle includes allowing the terminal to initiate the access request when the second limit value is smaller than or equal to the first limit value, the network device may configure the first limit value as 0001111 for a voice service with a non-contention-based access request type (an access probability is 16/128, approximately 12.5%), configure the first limit value as 0001000 for a data service with the non-contention-based access request type (an access probability is 9/128, approximately 7%), configure the first limit value as 0000100 for a voice service with a contention-based access request type (an access probability is 5/128, approximately 4%), and configure the first limit value as 0000010 for a data service of the contention-based access request type (an access probability is 3/128, approximately 2.3%).

As shown in FIG. 1, the present disclosure further provides in a second embodiment a control method applied for a network device, which includes the following steps.

Step 11: transmitting a first limit value. To be specific, the first limit value for at least one of load control, congestion control and access control may be transmitted to the terminal, and the access control may be to control the terminal to randomly access a network.

Step 12: transmitting an algorithm identifier. To be specific, the algorithm identifier for identifying a target algorithm may be transmitted to the terminal, and the terminal may calculate a second limit value using the target algorithm.

In this embodiment of the present disclosure, the network device may transmit the first limit value and the algorithm identifier, and the terminal may acquire a numerical value, i.e., the second limit value, for initiating the random access control using the algorithm indicated by the algorithm identifier. Here, the algorithm may include, but not limited to, a one-way function algorithm, a hash function algorithm or an elliptic function algorithm.

Each value of the algorithm identifier may correspond to a specific algorithm. For example, an algorithm identifier "1" may correspond to a Hash SHA256 algorithm, an algorithm identifier "2" may correspond to a scrypt algorithm, and an algorithm identifier "3" may correspond to a Hash Blake algorithm. These algorithms may be one-way functions.

The algorithm may also be agreed between the network device and the terminal. Correspondingly, the network device merely needs to transmit the first limit value for the random access request, as mentioned hereinabove in the first embodiment.

When a calculation difficulty of the first limit value is remarkably large, it is impossible for the terminal in a cell covered by the network device to access a network. When the calculation difficulty of the first limit value is very small, a huge quantity of terminals in the cell covered by the network device may initiate the access requests, resulting in congestion. Hence, the first limit value needs to be configured periodically or dynamically, so as to match a network load, thereby to effectively control the congestion.

In this embodiment of the present disclosure, the first limit value and/or the algorithm identifier may be configured by the network device periodically or dynamically.

Of course, the first limit value and/or the algorithm identifier may be configured by the network device dynamically in accordance with the load, or configured by the network device in accordance with the quantity of random access requests received within a first time window or a predicted value of the quantity of random access requests received within a second time window.

Here, the network device may configure the first limit value in accordance with a load value (the load value may include a random access resource load value, a control channel resource load value, or a shared data channel resource load value), so as to control calculation complexity (or difficulty) of the terminal, thereby to control the quantity of terminals capable of accessing the network within the time window.

In this embodiment of the present disclosure, the configuring, by the network device, the first limit value in accordance with the load may specifically include the followings.

1) When the second limit value is smaller than or equal to the first limit value and the load value of the network device is greater than a first threshold, the first limit value may be decremented by at least one adjustment step (e.g., decremented from 0001000 to 0000100). In a possible embodiment of the present disclosure, the first limit value may be decremented by at least one adjustment step at an effective time point of an adjustment period.

2) When the second limit value is smaller than or equal to the first limit value and the load value of the network device is smaller than a second threshold, the first limit value may be incremented by at least one adjustment step (e.g., incremented from 0000100 to 0001000). In a possible embodiment of the present disclosure, the first limit value may be incremented by at least one adjustment step at the effective time point of the adjustment period.

When the second limit value is greater than or equal to the first limit value, a similar method may be adopted, as long as an opposite adjustment direction is provided, which will not be particularly defined herein.

In this embodiment of the present disclosure, the configuring, by the network device, the algorithm identifier in accordance with the load may specifically include: 1) when the load value of the network device is greater than a third threshold, changing the algorithm identifier (e.g., changing SHA1 to SHA256 to increase the difficulty); or 2) when the load value of the network device is smaller than a fourth threshold, changing the algorithm identifier (e.g., changing SHA256 to SHA1 to decrease the difficulty).

In a possible embodiment of the present disclosure, the algorithm identifier may be changed by the network device at the effective time point of the adjustment period.

In this embodiment of the present disclosure, the configuring, by the network device, the first limit value in accordance with the quantity of random access requests received within the first time window or the predicted value of the quantity of random access requests received within the second time window may specifically include one of the followings.

1) When the quantity of random access requests received within the first time window is smaller than a fifth threshold or the predicted value of the quantity of random access requests received within the second time window is smaller than a sixth threshold, incrementing, by the network device, the first limit value by at least one adjustment step (e.g., adjusting the first limit value from 0000100 to 0001000). In a possible embodiment of the present disclosure, the first limit value may be incremented by the network device by at least one adjustment step at the effective time point of the adjustment period.

2) When the quantity of random access requests received within the first time window is greater than a seventh threshold or the predicted value of the quantity of random access requests received within the second time window is greater than an eighth threshold, decrementing, by the network device, the first limit value by at least one adjustment step (e.g., adjusting the first limit value from 0001000 to 0000100). In a possible embodiment of the present disclosure, the first limit value may be decremented by the network device by at least one adjustment step at the effective time point of the adjustment period.

In this embodiment of the present disclosure, the configuring, by the network device, the algorithm identifier in accordance with the quantity of random access requests received within the first time window or the predicted value of the quantity of random access requests received within the second time window may specifically include: 1) when the quantity of random access requests received within the first time window is smaller than a ninth threshold or the predicted value of the random access requests received within the second time window is smaller than a tenth threshold (i.e., when a preset time interval has elapsed and the difficulty is to be adjusted), changing, by the network device, the algorithm identifier; or 2) when the quantity of random access requests received within the first time window is greater than an eleventh threshold or the predicted value of the quantity of random access requests received within the second time window is greater than a twelfth threshold, changing, by the network device, the algorithm identifier.

In a possible embodiment of the present disclosure, the algorithm identifier may be changed by the network device at the effective time point of the adjustment period.

Further, in this embodiment of the present disclosure, when the load value of the network device is smaller than a thirteenth threshold, the network device may not broadcast the first limit value and/or the algorithm identifier.

In this embodiment of the present disclosure, the first to thirteenth thresholds may be equal to, or different from, each other.

Figure 2:
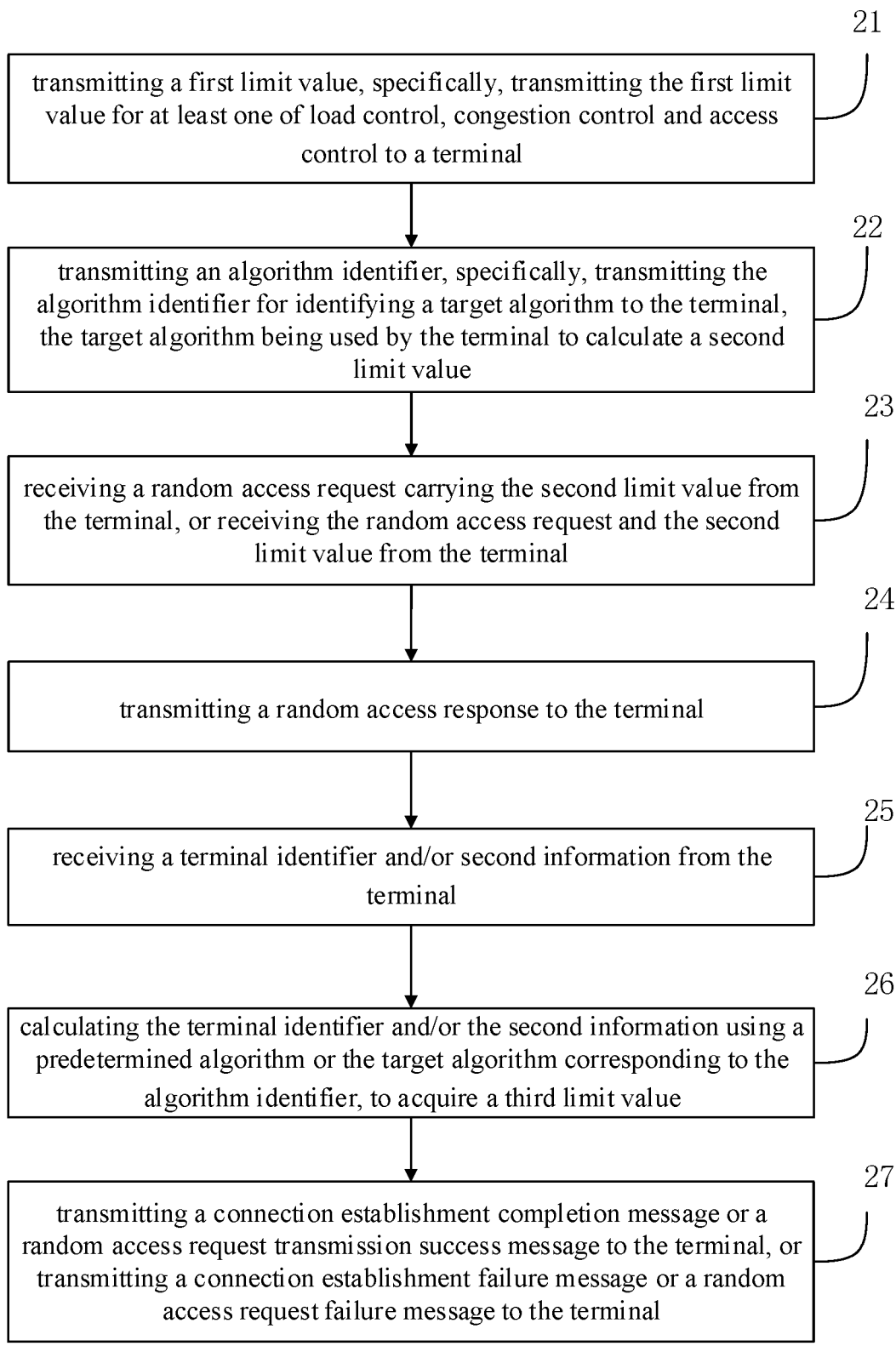
FIG. 2 is another flow chart of the control method at the network device side according to one embodiment of the present disclosure.

As shown in FIG. 2, the present disclosure further provides in a third embodiment a control method applied for a network device, which includes the following steps.

Step 21: transmitting a first limit value. To be specific, the first limit value for at least one of load control, congestion control and access control may be transmitted to a terminal, and the access control may be to control the terminal to randomly access a network.

Step 22: transmitting an algorithm identifier. To be specific, the algorithm identifier for identifying a target algorithm may be transmitted to the terminal, and the terminal may calculate a second value using the target algorithm.

Step 23: receiving a random access request carrying the second limit value from the terminal, or receiving the random access request and the second limit value from the terminal.

Here, the second limit value may be acquired by the terminal through calculating a terminal identifier and/or first information in according to the target algorithm or a predetermined algorithm.

Here, the first information may include a first field and a second field. Each of the first field and the second field may be a field with a fixed or variable length. The second field may also be a filled value at a predetermined base system.

The first field may include at least one of information about an algorithm identifier adopted for determining the second limit value, information about a time-domain resource for transmitting the random access request, a serial number of the time-domain resource for transmitting the random access request, information about a frequency-domain resource for transmitting the random access request, a serial number of the frequency-domain resource for transmitting the random access request, information about a preamble for transmitting the random access request, a serial number of the preamble for transmitting the random access request, and a network identifier. The terminal identifier may include International Mobile Subscriber Identification Number (IMSI), International Mobile Equipment Identity (IMEI), Temporary Mobile Subscriber Identity (TMSI) or Serving-Temporary Mobile Subscriber Identity (S-TMSI). The network identifier ma include network cell Identity (ID), global cell ID, or Public Land Mobile Network (PLMN).

For example, when the inputted predetermined first information is calculated using an algorithm (e.g., SHA256) corresponding to the algorithm identifier and the second field is a variable numerical value, the terminal may calculate the second limit value meeting the requirement on the first limit value through changing a length and/or content of the second field. The quantity of digits of the second limit value may be constant (a length of data inputted to a one-way function or hash function may be fixed or variable, but the quantity of digits of an output value may be fixed and the output values may be absolutely different). For example, using an HA256 function, the input data with different lengths may be converted into numerical values each with a length of 256 bits.

Of course, the second limit value may be acquired through calculating the terminal identifier using a predetermined algorithm or the algorithm corresponding to the algorithm identifier, or calculating the first field of the predetermined first information and the terminal identifier, or calculating the second field of the predetermined first information and the terminal identifier, or calculating the first field and the second field of the predetermined first information and the terminal identifier. Here, the predetermined algorithm may be an algorithm agreed in a protocol.

In this embodiment of the present disclosure, an random access request carrying the second limit value, or the random access request and the second limit value, may be transmitted by the terminal when the second limit value is smaller than or equal to the first limit value, or when the second limit value is greater than or equal to the first limit value. The terminal may acquire different second limit values using the algorithm corresponding to the algorithm identifier and through changing content of the second field.

In this embodiment of the present disclosure, the control method may further include Step 24, which specifically includes one of the following steps.

Step 241: when the second limit value is smaller than or equal to the first limit value, transmitting a random access response to the terminal. In a possible embodiment of the present disclosure, the random access response may further include the second limit value.

Step 242: when the second limit value is greater than or equal to the first limit value, transmitting the random access response to the terminal. In a possible embodiment of the present disclosure, the random access response may further include the second limit value.

In this embodiment of the present disclosure, the control method may further include Step 25 of receiving a terminal identifier and/or second information from the terminal. The second information may include a first field and/or a second field, the first field may include at least one of information about an algorithm identifier adopted for determining the second limit value, information about a time-domain resource for transmitting the random access request, a serial number of the time-domain resource for transmitting the random access request, information about a frequency-domain resource for transmitting the random access request, a serial number of the frequency-domain resource for transmitting the random access request, information about a preamble for transmitting the random access request, a serial number of the preamble for transmitting the random access request, and a network identifier, and the second field may include a filled value at a predetermined base system adopted for determining the second limit value.

Here, the second information may be a subset of the first information. Of course, it may also be the same as the first information.

In this embodiment of the present disclosure, the control method may further include Step 26 of calculating the terminal identifier and/or the second information using a predetermined algorithm or a target algorithm corresponding to the algorithm identifier, to acquire a third limit value. The predetermined algorithm or the target algorithm corresponding to the algorithm identifier may include one of a one-way function algorithm, a hash function algorithm and an elliptic function algorithm.

In this embodiment of the present disclosure, the control method may further include Step 27, which specifically includes: Step 271 of, when the second limit value is equal to the third limit value, transmitting a connection establishment completion message or a random access request transmission success message to the terminal; or Step 272 of, when the third limit value is smaller than the first limit value, transmitting the connection establishment completion message or the random access request transmission success message to the terminal; or Step 273 of, when the second limit value is smaller than or equal to the first limit value and the third limit value is equal to the second limit value, transmitting the connection establishment completion message or the random access request transmission success message to the terminal; or Step 274 of, when the second limit value is greater than the first limit value, transmitting the connection establishment completion message or the random access request transmission success message to the terminal; or Step 275 of, when the second limit value is greater than or equal to the first limit value and the third limit value is equal to the second limit value, transmitting the connection establishment completion message or the random access request transmission success message to the terminal; or Step 276 of, when the second limit value is not equal to the third limit value, transmitting a connection establishment failure message or a random access request transmission failure message to the terminal; or Step 277 of, when the second limit value is greater than or equal to the first limit value, transmitting the connection establishment failure message or the random access request transmission failure message to the terminal; or Step 278 of, when the second limit value is equal to the third limit value and the second limit value is greater than or equal to the first limit value, transmitting the connection establishment failure message or the random access request transmission failure message to the terminal; or Step 279 of, when the second limit value is smaller than or equal to the first limit value, transmitting the connection establishment failure message or the random access request transmission failure message to the terminal; or Step 280 of, when the second limit value is equal to the third limit value and the second limit value is smaller than or equal to the first limit value, transmitting the connection establishment failure message or the random access request transmission failure message to the terminal.

Step 241 may be combined with any of Steps 271, 272, 273, 276, 279 and 280, and Step 242 may be combined with any of Steps 271, 272, 274, 275, 276, 277 and 278.

In this embodiment of the present disclosure, when the second field of the first information is calculated by the terminal using the target algorithm corresponding to the algorithm identifier to acquire the second limit value, the network device may also calculate the second field using the target algorithm to acquire the third limit value, and then perform authentication and validation on a random access process for the terminal in accordance with the third limit value and the second limit value. Whether the generated value meets the algorithm requirement may be checked at once, so as to effectively prevent the occurrence of such a fraudulent behavior where the terminal performs the random access preferentially through cheating the network using a pseudo-random method. The above method may be implemented on the basis of such a characteristic that there is a complete random relationship between an output value and an input value of an algorithm, e.g., the one-way function, the hash function or the elliptic function. In other words, the input value is not fixedly associated with the output value, and the output value may be generated randomly. Hence, even if the terminal knows a limit value for allowing the access from the network, it is still impossible for the terminal to acquire a corresponding answer using the pseudo-random method. The network device may validate the validity of the limit value in accordance with all or parts of input parameters in the first information provided by the terminal for calculating the limit value. When part of the information for calculating the limit value, e.g., time-domain, frequency-domain and/or code-domain resources for transmitting the random access request, may be acquired by the network device in accordance with the received random access request, the first information reported by the terminal for validating the service merely needs to include other input information and numerical values, other than the above information.

In this embodiment of the present disclosure, the network device may adjust or configure the first limit value, so as to effectively control access policies for various scenarios with different services, different versions of terminals and different network loads. The network device may transmit the algorithm identifier to the terminal. The terminal may acquire the second limit value meeting an access condition through adjusting the content or length of the second field using the algorithm corresponding to the algorithm identifier, and initiate the random access request. As a result, it is able for the terminal to access the network without any congestion.

According to the method in the embodiment of the present disclosure, there is little change in a protocol process and the signaling overhead is relatively small, so it is able to improve the practicability of the method.

Figure 3:
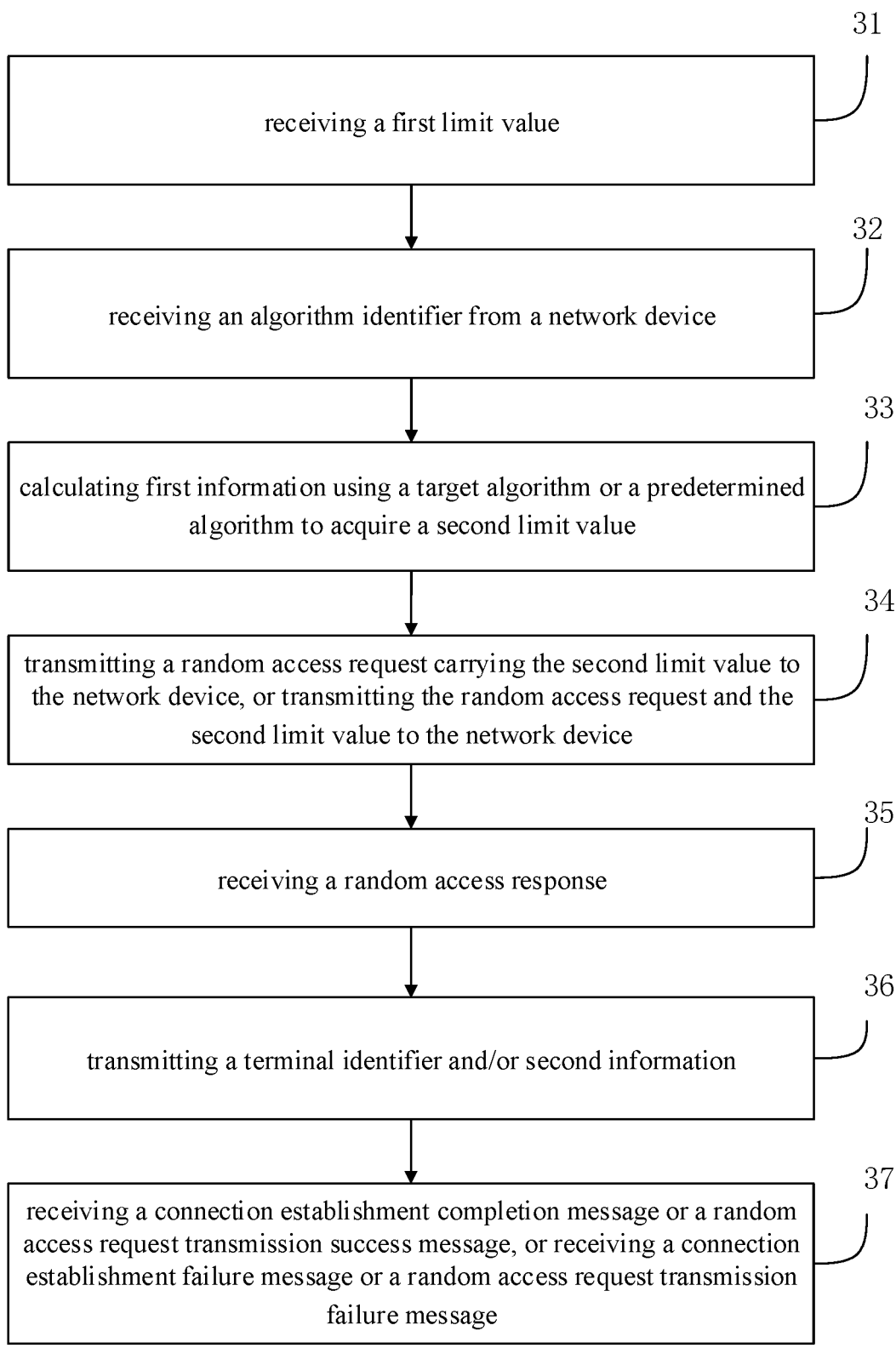
FIG. 3 is a flow chart of a control method at a terminal side according to one embodiment of the present disclosure.

As shown in FIG. 3, the present disclosure further provides in a fourth embodiment a control method applied for a terminal, which includes Step 31 of receiving a first limit value. To be specific, the first limit value for at least one of load control, congestion control and access control may be received from a network device, and the access control may be to control the terminal to randomly access a network.

In this embodiment of the present disclosure, the first limit value may be a numerical value at a predetermined base system and with predetermined digits, e.g., an 8-bit hexadecimal number.

The first limit value may be directly represented by the numerical value at the predetermined base system and with the predetermined digits. Alternatively, the first limit value may be represented by a coefficient and an index, the coefficient may be represented by a numerical value at the predetermined base system and with at least one digit in the predetermined digits, and the index may be represented by a numerical value at the predetermined base system and with the remaining digits in the predetermined digits. Alternatively, the first limit value may consist of a first part and a second part, the first part may be represented by at least one digit 0, and the second part may be represented by a numerical value at the predetermined base system with the remaining digits in the predetermined digits.

Here, the meaning of the first limit value may be the same as that mentioned in the first, second and third embodiments, all interpretations about the first limit value in these embodiments may be applied to the fourth embodiment of the present disclosure.

The control method may further include: Step 32 of receiving an algorithm identifier for identifying a target algorithm from the network device; and Step 33 of calculating first information in accordance with the target algorithm or a predetermined algorithm to acquire a second limit value.

Here, the meaning and the calculation method of the second limit value may be the same as those mentioned in the first, second and third embodiments. The second information may include a first field and/or a second field. To be specific, the first field and/or the second field of the second information may be calculated in accordance with the target algorithm or the predetermined algorithm so as to acquire the second limit value.

The first field or the second field may be a field with a fixed or variable length.

The second field may be a filled value at a predetermined base system and with a fixed or variable length.

The first field may include at least one of information about an algorithm identifier adopted for determining the second limit value, information about a time-domain resource for transmitting the random access request, a serial number of the time-domain resource for transmitting the random access request, information about a frequency-domain resource for transmitting the random access request, a serial number of the frequency-domain resource for transmitting the random access request, information about a preamble for transmitting the random access request, a serial number of the preamble for transmitting the random access request, and a network identifier.

In this embodiment of the present disclosure, the control method may further include Step 34 of, when the second limit value is smaller than or equal to the first limit value, transmitting a random access request carrying the second limit value, or the random access request and the second limit value, to the network device.

The control method may further include Step 35 of receiving a random access response.

The random access response may be transmitted by the network device to the terminal when the second limit value is smaller than or equal to the first limit value or when the second limit value is greater than or equal to the first limit value.

In this embodiment of the present disclosure, the random access response may include the second limit value.

In this embodiment of the present disclosure, the control method may further include Step 36 of transmitting a terminal identifier and/or second information. The second information may include a first field and/or a second field, the first field may include at least one of information about an algorithm identifier adopted for determining the second limit value, information about a time-domain resource for transmitting the random access request, a serial number of the time-domain resource for transmitting the random access request, information about a frequency-domain resource for transmitting the random access request, a serial number of the frequency-domain resource for transmitting the random access request, information about a preamble for transmitting the random access request, a serial number of the preamble for transmitting the random access request, and a network identifier, and the second field may include a filled value at a predetermined base system adopted for determining the second limit value.

In this embodiment of the present disclosure, the control method may further include Step 37 of receiving a connection establishment completion message or a random access request transmission success message, or receiving a connection establishment failure message or a random access request transmission failure message. The connection establishment completion message or the random access request transmission success message may be transmitted by the network device when the second limit value is equal to a third limit value, or when the third limit value is smaller than the first limit value, or when the second limit value is smaller than or equal to the first limit value and the third limit value is equal to the second limit value.

Alternatively, the connection establishment completion message or the random access request transmission success message may be transmitted by the network device when the second limit value is greater than the first limit value, or when the second limit value is greater than or equal to the first limit value and the third limit value is equal to the second limit value.

The connection establishment failure message or the random access request transmission failure message may be transmitted by the network device when the second limit value is not equal to the third limit value, or when the second limit value is greater than or equal to the first limit value, or when the second limit value is equal to the third limit value and the second limit value is greater than or equal to the first limit value.

Alternatively, the connection establishment failure message or the random access request transmission failure message may be transmitted by the network device when the second limit value is smaller than or equal to the first limit value, or when the second limit value is equal to the third limit value and the second limit value is smaller than or equal to the first limit value.

It should be appreciated that, meanings of same terms and expressions in this embodiment may have the same as those in the above-mentioned method for the network device, and the implementation of the method for the terminal may refer to those mentioned hereinabove with a same technical effect.

In this embodiment of the present disclosure, the terminal may acquire the second limit value meeting an access condition (e.g., the second limit value is smaller than the first limit value) through adjusting the content or length of the second field using the algorithm corresponding to the algorithm identifier, and initiate the random access request. As a result, it is able for the terminal to access the network without any congestion.

The network device may validate the second limit value carried in the random access request from the terminal. Whether the generated value meets the algorithm requirement may be checked at once, so as to effectively prevent the occurrence of such a fraudulent behavior where the terminal performs the random access preferentially through cheating the network using a pseudo-random method.

According to the method in the embodiment of the present disclosure, there is little change in a protocol process and the signaling overhead is relatively small, so it is able to improve the practicability of the method.

Figure 4:
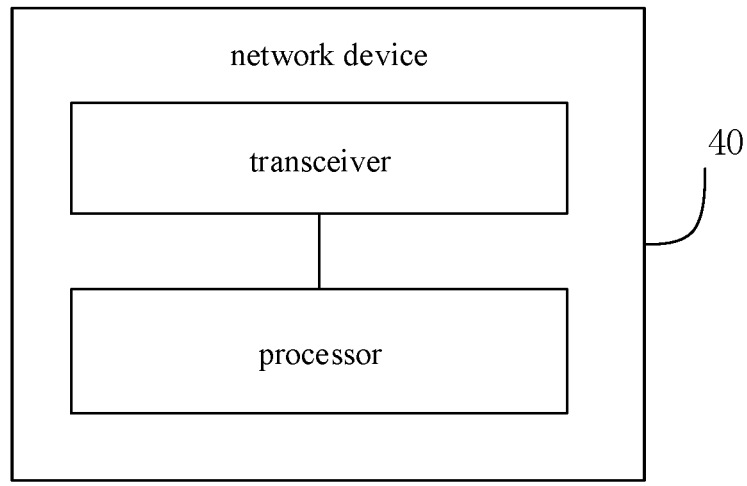
FIG. 4 is a schematic view showing a network device according to one embodiment of the present disclosure.

As shown in FIG. 4, corresponding to the first, second and third embodiments, the present disclosure further provides in a fifth embodiment a network device 40, which includes a transceiver configured to transmit a first limit value for at least one of load control, congestion control and access control.

In a possible embodiment of the present disclosure, the transceiver is further configured to transmit an algorithm identifier, and an algorithm corresponding to the algorithm identifier may be a target algorithm adopted by a terminal for calculating a second limit value.

In a possible embodiment of the present disclosure, the transceiver is further configured to receive a random access request carrying the second limit value, or receive the random access request and the second limit value, from the terminal.

In a possible embodiment of the present disclosure, the transceiver is further configured to: when the second limit value is smaller than or equal to the first limit value, transmit a random access response to the terminal; or when the second limit value is greater than or equal to the first limit value, transmit the random access response to the terminal.

In a possible embodiment of the present disclosure, the transceiver is further configured to receive a terminal identifier and/or second information from the terminal. The second information may include a first field and/or a second field, the first field may include at least one of information about an algorithm identifier adopted for determining the second limit value, information about a time-domain resource for transmitting the random access request, a serial number of the time-domain resource for transmitting the random access request, information about a frequency-domain resource for transmitting the random access request, a serial number of the frequency-domain resource for transmitting the random access request, information about a preamble for transmitting the random access request, a serial number of the preamble for transmitting the random access request, and a network identifier, and the second field may include a filled value at a predetermined base system adopted for determining the second limit value.

In a possible embodiment of the present disclosure, the network device may further include a processor configured to calculate the terminal identifier and/or the second information using a predetermined algorithm or a target algorithm corresponding to the algorithm identifier, to acquire a third limit value, and the predetermined algorithm or the target algorithm corresponding to the algorithm identifier may include one of a one-way function algorithm, a hash function algorithm and an elliptic function algorithm.

In a possible embodiment of the present disclosure, the transceiver is further configured to: when the second limit value is equal to the third limit value, transmit a connection establishment completion message or a random access request transmission success message to the terminal; or when the third limit value is smaller than the first limit value, transmit the connection establishment completion message or the random access request transmission success message to the terminal; or when the second limit value is smaller than or equal to the first limit value and the third limit value is equal to the second limit value, transmit the connection establishment completion message or the random access request transmission success message to the terminal.

In a possible embodiment of the present disclosure, the transceiver is further configured to: when the second limit value is greater than the first limit value, transmit a connection establishment completion message or a random access request transmission success message to the terminal; or when the second limit value is greater than or equal to the first limit value and the third limit value is equal to the second limit value, transmit the connection establishment completion message or the random access request transmission success message to the terminal.

In a possible embodiment of the present disclosure, the transceiver is further configured to: when the second limit value is not equal to the third limit value, transmit a connection establishment failure message or a random access request transmission failure message to the terminal; or when the second limit value is greater than or equal to the first limit value, transmit the connection establishment failure message or the random access request transmission failure message to the terminal; or when the second limit value is equal to the third limit value and greater than or equal to the first limit value, transmit the connection establishment failure message or the random access request transmission failure message to the terminal.

In a possible embodiment of the present disclosure, the transceiver is further configured to: when the second limit value is smaller than or equal to the first limit value, transmit a connection establishment failure message or a random access request transmission failure message to the terminal; or when the second limit value is equal to the third limit value and smaller than or equal to the first limit value, transmit the connection establishment failure message or the random access request transmission failure message to the terminal.

It should be appreciated that, the implementation of the network device may refer to those in the first, second and third embodiments of the present disclosure, with a same technical effect. The network device may further include a memory, the transceiver may be in communication with the processor via a bus interface or an interface, and the transceiver may also be in communication with the memory via the bus interface or the interface. The functions of the transceiver may also be implemented by the processor.

Figure 5:
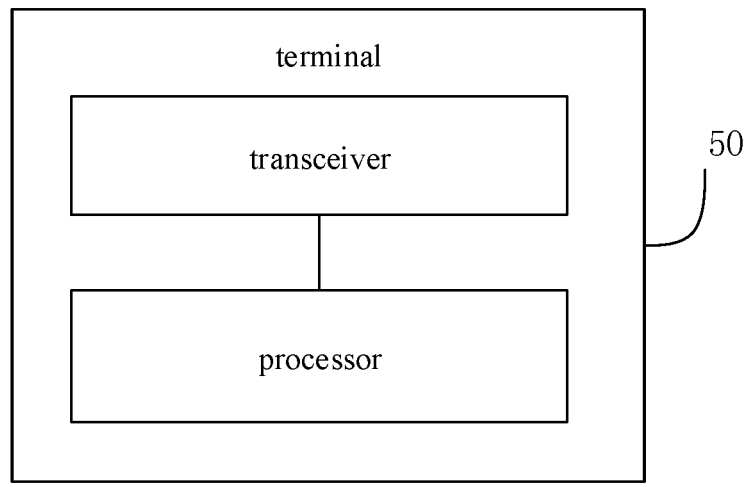
FIG. 5 is a schematic view showing a terminal according to one embodiment of the present disclosure.

As shown in FIG. 5, the present disclosure further provides in some embodiments a terminal 50, which includes a transceiver configured to receive a first limit value for at least one of load control, congestion control and access control.

In a possible embodiment of the present disclosure, the transceiver is further configured to receive an algorithm identifier.

In a possible embodiment of the present disclosure, the terminal further includes a processor configured to calculate a terminal identifier and/or first information in accordance with a predetermined algorithm or a target algorithm corresponding to the algorithm identifier to acquire a second limit value.

In a possible embodiment of the present disclosure, the transceiver is further configured to: when the second limit value is smaller than or equal to the first limit value, transmit a random access request carrying the second limit value, or transmit the random access request and the second limit value; or when the second limit value is greater than or equal to the first limit value, transmit the random access request carrying the second limit value, or transmit the random access request and the second limit value.

In a possible embodiment of the present disclosure, the transceiver is further configured to receive a random access response, and the random access response may be transmitted by a network device to the terminal when the second limit value is smaller than or equal to the first limit value or when the second limit value is greater than or equal to the first limit value.

In a possible embodiment of the present disclosure, the random access response may include the second limit value.

In a possible embodiment of the present disclosure, the transceiver is further configured to transmit the terminal identifier and/or second information. The second information may include a first field and/or a second field, the first field may include at least one of information about an algorithm identifier adopted for determining the second limit value, information about a time-domain resource for transmitting the random access request, a serial number of the time-domain resource for transmitting the random access request, information about a frequency-domain resource for transmitting the random access request, a serial number of the frequency-domain resource for transmitting the random access request, information about a preamble for transmitting the random access request, a serial number of the preamble for transmitting the random access request, and a network identifier, and the second field may include a filled value at a predetermined base system adopted for determining the second limit value.

In a possible embodiment of the present disclosure, the transceiver is further configured to receive a connection establishment completion message or a random access request transmission success message, and the connection establishment completion message or the random access request transmission success message may be transmitted by the network device when the second limit value is equal to a third limit value, or when the third limit value is smaller than the first limit value, or when the second limit value is smaller than or equal to the first limit value and the third limit value is equal to the second limit value.

In a possible embodiment of the present disclosure, the transceiver is further configured to receive a connection establishment completion message or a random access request transmission success message, and the connection establishment completion message or the random access request transmission success message may be transmitted by the network device when the second limit value is greater than the first limit value, or when the second limit value is greater than or equal to the first limit value and the third limit value is equal to the second limit value.

In a possible embodiment of the present disclosure, the transceiver is further configured to receive a connection establishment failure message or a random access request transmission failure message, and the connection establishment failure message or the random access request transmission failure message may be transmitted by the network device when the second limit value is not equal to the third limit value, or when the second limit value is greater than or equal to the first limit value, or when the second limit value is equal to the third limit value and the second limit value is greater than or equal to the first limit value.

In a possible embodiment of the present disclosure, the transceiver is further configured to receive a connection establishment failure message or a random access request transmission failure message, and the connection establishment failure message or the random access request transmission failure message may be transmitted by the network device when the second limit value is smaller than or equal to the first limit value, or when the second limit value is equal to the third limit value and the second limit value is smaller than or equal to the first limit value.

It should be appreciated that, the implementation of the terminal may refer to that in the fourth embodiment of the present disclosure, with a same technical effect. The terminal may further include a memory, the transceiver may be in communication with the processor via a bus interface or an interface, and the transceiver may also be in communication with the memory via the bus interface or the interface. The functions of the transceiver may also be implemented by the processor. The terminal may further include any other component for implementing the above-mentioned method, e.g., a user interface.

The present disclosure further provides in some embodiments a control method, which includes: Step 510 of transmitting, by a network device, a first limit value for at least one of load control, congestion control and access control; Step 511 of receiving, by a terminal, the first limit value; Step 512 of determining, by the terminal, a second limit value, and transmitting a random access request carrying the second limit value, or the random access request and the second limit value, to the network device when the second limit value is smaller than or equal to the first limit value, or transmitting the random access request carrying the second limit value, or the random access request and the second limit value, to the network device when the second limit value is greater than or equal to the first limit value; Step 513 of receiving, by the network side device, the random access request carrying the second limit value, or the random access request and the second limit value; and Step 514 of transmitting, by the network device, a random access response when the second limit value is smaller than or equal to the first limit value, or when the second limit value is greater than or equal to the first limit value.

The control method may further include: Step 515 of transmitting, by the terminal, a terminal identifier and/or second information; and Step 516 of transmitting, by the network device, a connection establishment completion message or a random access request transmission success message to the terminal, or transmitting a connection establishment failure message or a random access request transmission failure message to the terminal.

It should be appreciated that, the implementation of the control method may refer to those for the network device and the terminal mentioned hereinabove with a same technical effect, which will not be particularly defined herein.

Figure 6:
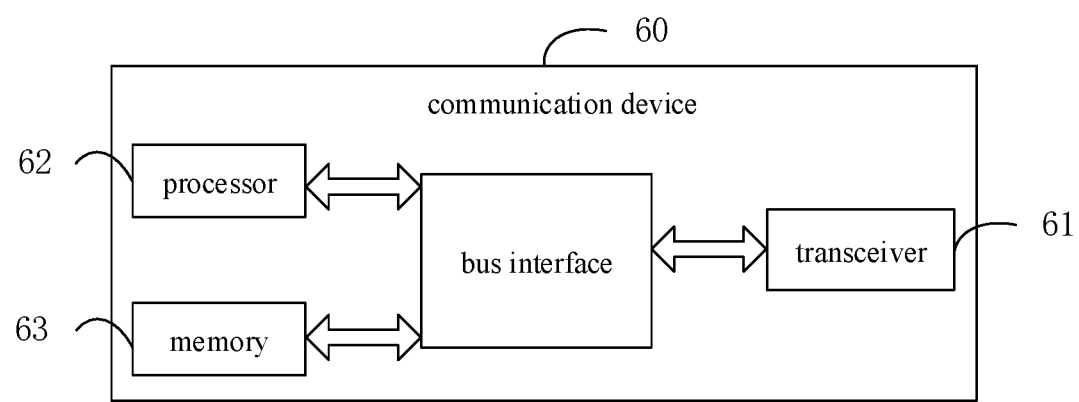
FIG. 6 is a schematic view showing a communication device according to one embodiment of the present disclosure.

As shown in FIG. 6, the present disclosure further provides in some embodiments a communication device 60 which includes a processor 62, and a memory 63 storing therein a computer program. The computer program is executed by the processor 62 so as to implement the above-mentioned methods.

It should be appreciated that, the communication device may be the above-mentioned network device, or the above-mentioned terminal. The communication device may further include a transceiver 61 communicating with the processor 62 and the memory 63 via a bus interface or an interface. The functions of the transceiver may be also be implemented by the processors. The communication device may further include any other components for implementing the above-mentioned methods. The implementation of the communication device may refer to those in the above-mentioned method embodiments with a same technical effect. The communication device may be the terminal, or the network device, e.g., a base system station.

The present disclosure further provides in some embodiments a computer-readable storage medium storing therein an instruction. The instruction is executed by a computer so as to implement the above-mentioned methods.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. Of course, some steps may also be performed in parallel, or independently of each other. It should be further appreciated that, after reading the descriptions of the present disclosure, it is able for a person skilled in the art, using a basic programming skill, to implement any or all steps of the method and any or all members of the device in any computing device (including a processor and a storage medium) or a network consisting of the computing devices, in the form of hardware, firmware, software or a combination thereof.

Hence, the purposes of the present disclosure may also be implemented by one program or a set of programs running on any computing device, e.g., a known general-purpose computer, or implemented merely by a program product including programs codes capable of implementing the method or device. In other words, this program product and a storage medium storing therein the program product also constitute a part of the present disclosure. Obviously, the storage medium may be any known storage medium or a storage medium that may occur in future. It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. Of course, some steps may also be performed in parallel, or independently of each other.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A control method performed by a network device, comprising:
    transmitting a first limit value for at least one of load control, congestion control and access control to a terminal, wherein the first limit value is a numerical value at a predetermined base system and with predetermined digits, the first limit value is represented by a coefficient and an index, the coefficient is represented by a numerical value at the predetermined base system and with at least one digit in the predetermined digits, and the index is represented by a numerical value at the predetermined base system and with the remaining digits in the predetermined digits;
    transmitting an algorithm identifier to the terminal;
    receiving a random access request carrying a second limit value from the terminal, or receiving a random access request and a second limit value from the terminal,
    wherein the second limit value is acquired through calculating, by the terminal, a terminal identifier and/or first information in accordance with a predetermined algorithm or in accordance with a target algorithm corresponding to the algorithm identifier;
    wherein the second limit value is a numerical value for initiating the access control, and the random access request carrying the second limit value is transmitted by the terminal in case that the second limit value is smaller than or equal to the first limit value, or the random access request and the second limit value are transmitted by the terminal in case that the second limit value is smaller than or equal to the first limit value;
    wherein the predetermined algorithm or the target algorithm corresponding to the algorithm identifier comprises one of a one-way function algorithm, a hash function algorithm and an elliptic function algorithm.

2. The control method according to claim 1, wherein the transmitting the first limit value to the terminal comprises transmitting the first limit value in accordance with an access type, a terminal protocol version, a category, a Quality of Service (QoS) requirement, an access request type, a terminal brand and/or a terminal type.

3. The control method according to claim 1, wherein the first limit value and/or the algorithm identifier is configured dynamically or periodically.

4. The control method according to claim 1, wherein
    the first limit value and/or the algorithm identifier are configured in accordance with a load of a network device; or
    the first limit value and/or the algorithm identifier are configured in accordance with a quantity of random access requests received within a first time window or a predicted value of a quantity of random access requests received within a second time window.

5. The control method according to claim 4, wherein the first limit value is configured in accordance with the load of the network device in following ways: decrementing the first limit value by at least one adjustment step when the load of the network device is greater than a first threshold; or incrementing the first limit value by at least one adjustment step when the load of the network device is smaller than a second threshold; or
    wherein the algorithm identifier is configured in accordance with the load of the network device in following ways: changing the algorithm identifier when the load of the network device is greater than a third threshold; or changing the algorithm identifier when the load of the network device is smaller than a fourth threshold;
    wherein the first limit value is configured in accordance with the quantity of random access requests received within the first time window or the predicted value of the quantity of random access requests received within the second time window in following ways: incrementing the first limit value by at least one adjustment step when the quantity of random access requests received within the first time window is smaller than a fifth threshold or the predicted value of the quantity of random access requests received within the second time window is smaller than a sixth threshold; or decrementing the first limit value by at least one adjustment step when the quantity of random access requests received within the first time window is greater than a seventh threshold or the predicted value of the quantity of random access requests received within the second time window is greater than an eighth threshold; or
    wherein the algorithm identifier is configured in accordance with the quantity of random access requests received within the first time window or the predicted value of the quantity of random access requests received within the second time window in following ways: changing the algorithm identifier when the quantity of random access requests received within the first time window is smaller than a ninth threshold or the predicted value of the random access requests received within the second time window is smaller than a tenth threshold; or changing the algorithm identifier when the quantity of random access requests received within the first time window is greater than an eleventh threshold or the predicted value of the quantity of random access requests received within the second time window is greater than a twelfth threshold.

6. The control method according to claim 1, wherein the first information comprises a first field and/or a second field, and the second limit value is acquired through calculating, by the terminal, the terminal identifier and/or the first field and/or the second field of the first information in accordance with the predetermined algorithm or in accordance with the target algorithm corresponding to the algorithm identifier.

7. The control method according to claim 6, wherein the first field or the second field is a field having a fixed or variable length, or the second field is a filled value at a predetermined base system, or the first field comprises at least one of information about the algorithm identifier adopted for determining the second limit value, information about a time-domain resource for transmitting the random access request, a serial number of the time-domain resource for transmitting the random access request, information about a frequency-domain resource for transmitting the random access request, a serial number of the frequency-domain resource for transmitting the random access request, information about a preamble for transmitting the random access request, a serial number of the preamble for transmitting the random access request, and a network identifier.

8. The control method according to claim 1, further comprising:

transmitting a random access response to the terminal when the second limit value is smaller than or equal to the first limit value;

wherein the random access response comprises the second limit value.

9. The control method according to claim 8, further comprising:

receiving the terminal identifier and/or second information from the terminal, wherein the second information comprises a first field and/or a second field, the first field comprises at least one of information about the algorithm identifier adopted for determining the second limit value, information about a time-domain resource for transmitting the random access request, a serial number of the time-domain resource for transmitting the random access request, information about a frequency-domain resource for transmitting the random access request, a serial number of the frequency-domain resource for transmitting the random access request, information about a preamble for transmitting the random access request, a serial number of the preamble for transmitting the random access request, and a network identifier, and the second field comprises a filled value at a predetermined base system adopted for determining the second limit value.

10. The control method according to claim 9, further comprising:

calculating the terminal identifier and/or the second information using a predetermined algorithm or a target algorithm corresponding to the algorithm identifier, to acquire a third limit value.

11. The control method according to claim 10, further comprising:

transmitting a connection establishment completion message or a random access request transmission success message to the terminal when the second limit value is equal to the third limit value; or transmitting the connection establishment completion message or the random access request transmission success message to the terminal when the third limit value is smaller than the first limit value; or transmitting the connection establishment completion message or the random access request transmission success message to the terminal when the second limit value is smaller than or equal to the first limit value and the third limit value is equal to the second limit value; or transmitting a connection establishment completion message or a random access request transmission success message to the terminal when the second limit value is greater than the first limit value; or transmitting the connection establishment completion message or the random access request transmission success message to the terminal when the second limit value is greater than or equal to the first limit value and the third limit value is equal to the second limit value; or transmitting a connection establishment failure message or a random access request transmission failure message to the terminal when the second limit value is not equal to the third limit value; or transmitting the connection establishment failure message or the random access request transmission failure message to the terminal when the second limit value is greater than or equal to the first limit value; or transmitting the connection establishment failure message or the random access request transmission failure message to the terminal when the second limit value is equal to the third limit value and greater than or equal to the first limit value; or transmitting a connection establishment failure message or a random access request transmission failure message to the terminal when the second limit value is smaller than or equal to the first limit value; or transmitting the connection establishment failure message or the random access request transmission failure message to the terminal when the second limit value is equal to the third limit value and smaller than or equal to the first limit value.

12. A control method performed by a terminal, comprising:

receiving a first limit value for at least one of load control, congestion control and access control from a network device, wherein the first limit value is a numerical value at a predetermined base system and with predetermined digits, the first limit value is represented by a coefficient and an index, the coefficient is represented by a numerical value at the predetermined base system and with at least one digit in the predetermined digits, and the index is represented by a numerical value at the predetermined base system and with the remaining digits in the predetermined digits;

receiving an algorithm identifier from the network device;

calculating a terminal identifier and/or first information in accordance with a predetermined algorithm or in accordance with a target algorithm corresponding to the algorithm identifier to acquire a second limit value, wherein the second limit value is a numerical value for initiating the access control;

transmitting a random access request carrying the second limit value when the second limit value is smaller than or equal to the first limit value, or transmitting the random access request and the second limit value when the second limit value is smaller than or equal to the first limit value;

wherein the predetermined algorithm or the target algorithm corresponding to the algorithm identifier comprises one of a one-way function algorithm, a hash function algorithm and an elliptic function algorithm.

13. A network device, comprising a processor, and a memory storing therein a computer program, wherein the computer program is executed by the processor so as to implement the control method according to claim 1.

14. A terminal, comprising a processor, and a memory storing therein a computer program, wherein the computer program is executed by the processor so as to implement the control method according to claim 12.

15. A control method, comprising:

transmitting, by a network device, a first limit value for at least one of load control, congestion control and access control;

receiving, by a terminal, the first limit value, wherein the first limit value is a numerical value at a predetermined base system and with predetermined digits, the first limit value is represented by a coefficient and an index, the coefficient is represented by a numerical value at the predetermined base system and with at least one digit in the predetermined digits, and the index is represented by a numerical value at the predetermined base system and with the remaining digits in the predetermined digits;

transmitting an algorithm identifier by the network device to the terminal;

receiving the algorithm identifier by the terminal and determining, by the terminal, a second limit value, and transmitting a random access request carrying the second limit value when the second limit value is smaller than or equal to the first limit value, or transmitting the random access request and the second limit value, to the network device when the second limit value is smaller than or equal to the first limit value, wherein the second limit value is acquired through calculating, by the terminal, a terminal identifier and/or first information in accordance with a predetermined algorithm or in accordance with a target algorithm corresponding to an algorithm identifier, and the second limit value is a numerical value for initiating the random access control;

receiving, by the network side device, the random access request carrying the second limit value, or the random access request and the second limit value; and transmitting, by the network device, a random access response when the second limit value is smaller than or equal to the first limit value;

wherein the method further comprises transmitting, by the network device, the algorithm identifier, wherein an algorithm corresponding to the algorithm identifier is the target algorithm adopted by the terminal for calculating the second limit value;

wherein the predetermined algorithm or the target algorithm corresponding to the algorithm identifier comprises one of a one-way function algorithm, a hash function algorithm and an elliptic function algorithm.

* * * * *